Aug. 14, 1951 A. THORMAN 2,564,630
POULTRY HOLDING AND WEIGHING HOOK OR SHACKLE
Filed Aug. 26, 1946
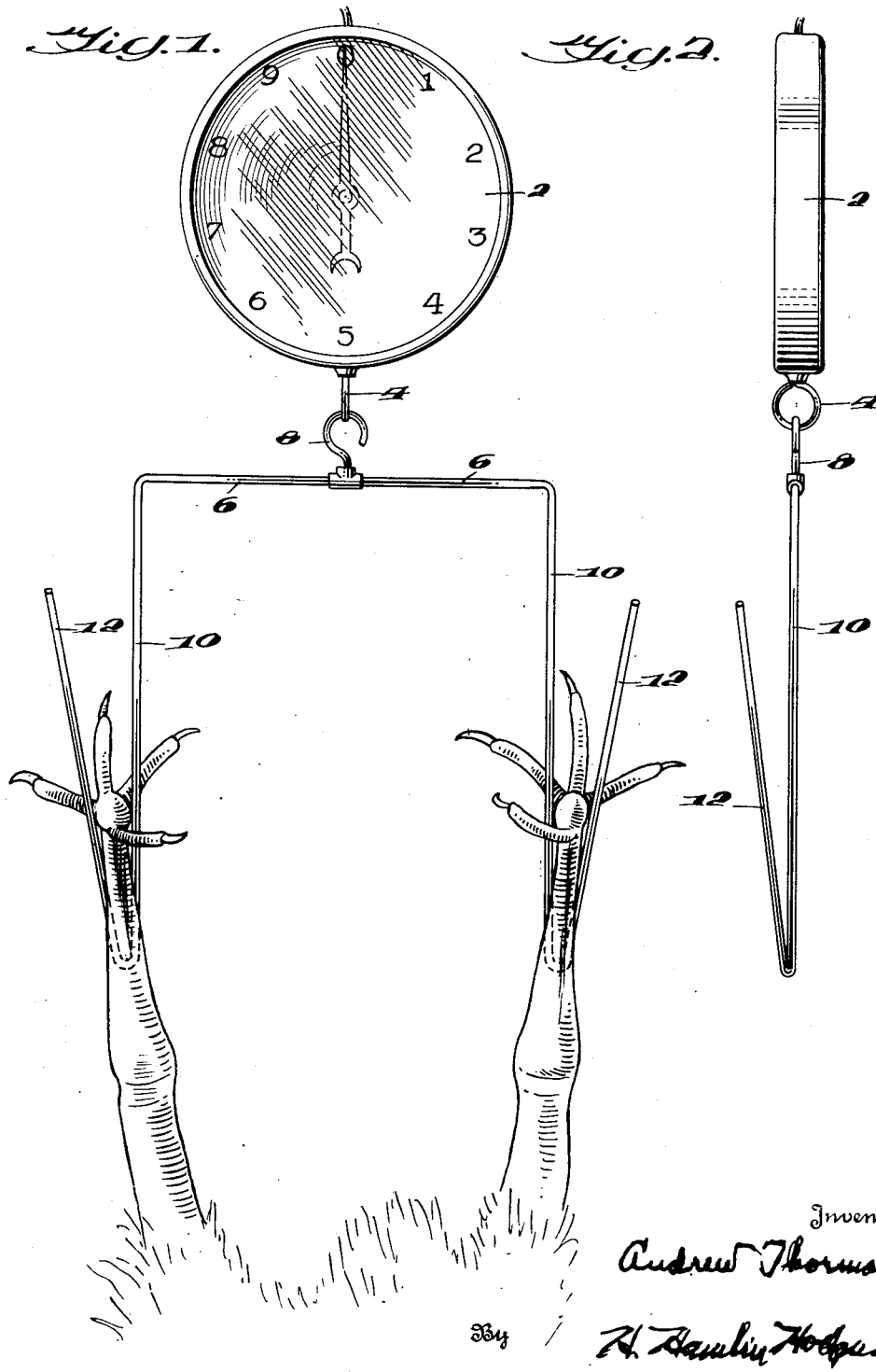
Inventor
Andrew Thorman
By H. Hamlin Hodges
Attorney Patented Aug. 14, 1951

2,564,630

UNITED STATES PATENT OFFICE 2,564,630

POULTRY HOLDING AND WEIGHING HOOK OR SHACKLE

Andrew Thorman, North Tonawanda, N. Y.

Application August 26, 1946, Serial No. 693,100

1 Claim. (Cl. 17—44.1)

My invention relates to a poultry holding and weighing hook or shackle.

In the past it has often been difficult to weigh live fowls because of the equipment required. For example, previously a live fowl has been tied so that it may be laid on a flat or basket type scale. Also a funnel type container has been used, but often it is difficult to use this type because of the size of a fowl to be weighed.

An object of my invention is to provide a hook or shackle specially shaped and adapted to suspend live poultry and to be attached to a conventional weighing scale.

A further object of my invention is to provide a hook or shackle adapted to suitably support live poultry without injuring the same while being suspended on a scale for weighing purposes.

A still further object is to provide a hook or shackle for suspending live poultry by their legs, which are spaced apart, while the poultry is held for weighing purposes. My invention can also be used without a scale for holding all types of fowl and poultry in order to vaccinate, debeak and put bits on turkeys and chickens of all sizes and for artificial breeding purposes. The hook will hold any fowl or poultry in a quiet and completely relaxed position and will not cause damage to the legs or feet or in any way cause discomfort to fowl while being suspended.

The hook should be made so that it will weigh about one and three-quarters pounds so as to balance the scale. The hooks that are used for merely holding fowl can be of any weight or size.

A still further object is to provide a bar adapted to be secured to a weighing scale, said bar being bent to form suitable hook or shackle sections conveniently positioned to hold a fowl's legs without injuring them.

In the accompanying drawings:

Fig. 1 is a view in front elevation, showing in full lines the manner in which poultry may be supported; and Fig. 2 is a view in side elevation.

By utilizing a conventional spring weighing scale 2, which is provided with a depending ring 4, and which is suitably supported from above, I am able to attach my poultry holding and weighing hook or shackle thereto. By adjusting the spring mechanism of the scale, the indicator thereon will point to zero at a time that the poultry holding and weighing hook is in position to receive the poultry to be weighed.

My poultry holding and weighing hook is preferably formed of a suitable metallic rod 6 to which is attached at the approximate center thereof a suitable and conventional hook 8. The hook 8 may be welded to the rod 6 or otherwise secured thereto, preferably approximately in the center of the rod 6, so that the rod 6 may be balanced by its own weight upon the hook which is adapted to be held by the ring 4 of the scale 2.

The rod 6 preferably extends outwardly in both directions from the hook 8 and then is bent at approximately right angles thereto to form vertically extending rod sections 10. It will be understood that the distance between the hook 8 and the right-angle bend may be varied for poultry weighing hooks or shackles adapted to be utilized in the weighing of different fowls, such, for example, as turkeys, chickens or pullets.

The vertically extending rod sections 10 preferably continue in a straight condition to any desired predetermined point, at which point they are bent upwardly upon themselves in a V-shape forming an end leg 12. The leg 12 of the rod preferably is not only bent to form a V between itself and the vertically extending rod 10, but also is preferably pulled outwardly from the plane in which the rod sections 10 and the center section 6 of the rod are positioned. By this construction, the V formed between the leg 12 and the vertically positioned section 10 of the rod 6 will be in convenient position, so that the end of the leg 12 will be spaced laterally of the vertical rod section 10 as well as extending outwardly therefrom.

With the poultry holding and weighing hook or shackle formed in this manner, it will be seen that suitable V-shaped hooks will be provided, formed of a contiguous extension of the rod 6, so that the legs or feet of a fowl may be conveniently held by the V the fowl being held in an inverted position where it will be conveniently immobilized while being weighed. The V-shaped hook being provided as described above, as not only extending laterally from the vertical sections 10, but also forwardly thereof (as shown clearly in the two figures) it will be obvious that the legs of a fowl may be easily guided into the V of the hook and held there while the fowl is being weighed.

While I have found that certain dimensions have proven to be satisfactory for the distance between the vertical legs 10 and the supporting hook 8, and also for the length of those legs as well as for the length of the end legs 12, it will be understood that various dimensions may be utilized for forming a hook or shackle similar to the hook described above and producing a hook which can be satisfactorily utilized for poultry weighing purposes. Also I have found that satisfactory results can be obtained by utilizing a rod of round, cold rolled wire having a diameter of approximately three-eighths inch (3/8"), but in this respect, too, it will be obvious that wire or other metal or plastic material may be readily utilized to form my poultry holding and weighing hook.

I claim:

A poultry holding and weighing hook or shackle adapted to engage the legs of the poultry comprising a substantially horizontally disposed rod, said rod being provided at its mid portion with a supporting means, the end portions of said rod extending normally downwardly and then upwardly to form acute angles, said upwardly extending portions extending out of the plane of the downwardly extending portions and on one side thereof, and the lower portions of the said downwardly and upwardly extending portions being spaced apart a distance less than the thickness of the legs of the poultry being held thereby.

ANDREW THORMAN.

REFERENCES CITED

The following references are of record in the file of this patent:

UNITED STATES PATENTS

| Number | Name | Date |
|---|---|---|
| 1,217,334 | Nelson | Feb. 27, 1917 |
| 1,438,659 | Nailor | Dec. 12, 1922 |
| 1,532,974 | Alber et al. | Apr. 7, 1925 |
| 1,742,569 | Barker et al. | Jan. 7, 1930 |